US011484991B2

(12) United States Patent
Xia et al.

(10) Patent No.: US 11,484,991 B2
(45) Date of Patent: Nov. 1, 2022

(54) INTERNAL AND EXTERNAL CLAMPING METHOD AND DEVICE OF THIN-WALL TUBULAR PART DURING ROTARY PROCESSING (71) Applicant: South China University of Technology, Guangzhou (CN)

(72) Inventors: Qinxiang Xia, Guangzhou (CN); Jinchuan Long, Guangzhou (CN); Xiuquan Cheng, Guangzhou (CN); Yingchao Xiong, Guangzhou (CN); Gangfeng Xiao, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 183 days.

(21) Appl. No.: 16/959,877

(22) PCT Filed: Oct. 25, 2018

(86) PCT No.: PCT/CN2018/111935
§ 371 (c)(1),
(2) Date: Jul. 2, 2020

(87) PCT Pub. No.: WO2019/134425
PCT Pub. Date: Jul. 11, 2019

(65) Prior Publication Data
US 2020/0331122 A1    Oct. 22, 2020

(30) Foreign Application Priority Data
Jan. 4, 2018  (CN) .......................... 201810007613.6

(51) Int. Cl.
*B25B 5/14*   (2006.01)
*B25B 5/04*   (2006.01)

(52) U.S. Cl.
CPC ................ *B25B 5/147* (2013.01); *B25B 5/04* (2013.01)

(58) Field of Classification Search
CPC ........... B25B 5/04; B25B 5/147; B25B 11/00; B25B 11/02; B25B 13/50; B25B 13/5008;
(Continued)

(56) References Cited

U.S. PATENT DOCUMENTS 4,647,051 A    3/1987  Stone et al.
9,759,301 B2 *  9/2017  Xu ........................... B23B 31/42

FOREIGN PATENT DOCUMENTS

CN    104607681 A  *  5/2015
CN    104607681 A       5/2015
(Continued)

OTHER PUBLICATIONS

CN-104607681—Machine Translation (Year: 2015).*
International Search Report and Written Opinion dated Jan. 22, 2019 by State Intellectual Property Office of the P. R. China.

*Primary Examiner* — Lee D Wilson
*Assistant Examiner* — Alberto Saenz
(74) *Attorney, Agent, or Firm* — Fishman Stewart PLLC (57) ABSTRACT The present disclosure discloses an internal and external clamping method and device of a thin-wall tubular part during rotary processing. A plurality of support blocks of this device are spaced to form an annular structure around the flange bush; the middle portion of each support block is provided with a through hole; a support claw is provided between every two support blocks, and the side surface of the support claw is provided with the through hole; a rotary shaft penetrates through the through holes in the support claws and the support blocks; and the plurality of support claws are spaced to form a support claw ring having the annular structure.

11 Claims, 5 Drawing Sheets

(58) Field of Classification Search
CPC . B25B 13/54; B23B 31/4006; B23B 31/4026;
B23B 31/42; B23Q 3/082; B23Q 3/102;
B23Q 3/103; B23Q 3/106; B23Q 3/107;
B23Q 3/108; Y10T 29/53661; Y10T
29/5367; Y10T 29/5387; Y10T 29/53874;
Y10T 29/53878; Y10T 29/53887
USPC .................................. 29/559, 281.1, 281.6
See application file for complete search history.

(56) References Cited

FOREIGN PATENT DOCUMENTS

| CN | 105179691 A | 12/2015 |
|---|---|---|
| CN | 107983981 A | 5/2018 |
| CN | 207823987 U | 9/2018 |

\* cited by examiner

INTERNAL AND EXTERNAL CLAMPING METHOD AND DEVICE OF THIN-WALL TUBULAR PART DURING ROTARY PROCESSING

CROSS-REFERENCE TO RELATED APPLICATIONS

This application is a National Phase application claiming the benefit of International Application No PCT/CN2018/111935 filed Oct. 25, 2018, which claims priority to Chinese Patent Application No. CN 201810007613.6, filed Jan. 4, 2018, the complete disclosures of which are hereby incorporated in by reference in their entireties.

FIELD OF THE DISCLOSURE

The present disclosure, belonging to the field of machining technology, relates to clamping of a thin-wall tubular part, in particular to an internal and external clamping method and device of a thin-wall tubular part during rotary processing.

BACKGROUND OF THE DISCLOSURE

There is a kind of thin-wall tubular parts in the field of machining. The clamping method of the tubular parts during rotary processing is generally external clamping. When the clampable region of the tubular part is short, the tubular part will have a poor clamping effect and is easy to slip during the processing. Therefore, solid bars are often filled inside the tubular part to achieve internal and external clamping of the tubular part. However, when the diameter of the mouth portion of the tubular part is smaller than that of the middle portion of the same, this clamping method of filling with the solid bar is no longer applicable. Therefore, there is an urgent need for an effective internal and external clamping method and device to achieve, during the rotary processing, the clamping of a thin-wall tubular part with a short clampable region and a mouth portion smaller than the middle portion in diameter.

CONTENTS OF THE DISCLOSURE

In view of the shortage of internal and external clamping of a thin-wall tubular part with a short clampable region and a mouth portion smaller than the middle portion in diameter existing in the prior art, the present disclosure proposes an effective internal and external clamping method and device of a thin-wall tubular part during rotary processing, so as to improve the clamping reliability of the thin-wall tubular part.

In order to achieve the above object, the present disclosure provides the following technical solution:

An internal and external clamping device of a thin-wall tubular part during rotary processing is provided, comprising a first pull rod, a second pull rod, an inner cylinder, an outer sleeve, a wedge-shaped sleeve, a hook, a clamping cylinder, a threaded push rod, a support claw ring, a spring, a washer, a nut, a support block, a rotary shaft, a jacket, a flange bush and a support plate; the first pull rod and the second pull rod are connected with each other and respectively provided with a flange; the second pull rod is connected with the inner cylinder, and connected at one end with the threaded push rod, the first pull rod being disposed at the other end of the second pull rod, the inner cylinder being provided on the outer periphery with the outer sleeve; the inner cylinder is provided on the outer periphery in the ring direction with a plurality of guide key grooves, which are provided inside with guide keys; the outer sleeve is provided with a guide groove on the inner cylindrical surface corresponding to the periphery of the guide key groove of the inner cylinder, and connected at one end to the main shaft of the machine tool and at the other end to the jacket;

the wedge-shaped sleeve is connected at one end to the inner cylinder, and at the other end to the clamping cylinder, the other end of which is arranged in the wedge-shaped surface of the jacket; the wedge-shaped sleeve is provided on the outer peripheral surface with a plurality of hooks at intervals, which are provided with steps at the right end; the clamping cylinder is provided on both sides of the outer wall with a wedge-shaped surface having the same inclination angle as the inner side of one end of the wedge-shaped sleeve and the inner side of the jacket; the clamping cylinder is provided on the outer circumference with an annular groove, which is connected to the step on the hook; the clamping cylinder is provided with a plurality of grooves at intervals in the circumferential direction from both ends to the middle;

a plurality of support blocks are spaced to form an annular structure around the flange bush; the middle portion of each support block is provided with a through hole; a support claw is provided between every two support blocks, and the side surface of the support claw is provided with the through hole; a rotary shaft penetrates through the through holes in the support claws and the support blocks; a plurality of rotary shafts are spaced to form an annular structure around the flange bush;

a flange bush, arranged between the inner cylinder and the second pull rod, is provided at one end with a flange, which is provided at one end face with grooves identical to the support blocks in number and shape, with the support block fixed in the groove of the flange of the flange bush; the other end of the flange bush is connected through the flange to the support plate, which is connected to the outer sleeve;

a round step is arranged on the threaded push rod, on which the spring, the washer and the nut are sleeved; a plurality of support claws are spaced to form a support claw ring having the annular structure; each support claw is formed by connecting the front end, the rear end, and the bottom; the outer surface of the front end, used to press against the inner wall of the thin-wall tubular part, is an arc surface with the same curvature as the inner wall of the thin-wall tubular part; the spring is connected at one end to the bottom of the support claw ring, and at the other end to the washer, with a nut arranged outside the washer; the support claw ring is placed inside the clamping cylinder, and the thin-wall tubular part is placed between the outer surface of the support claw ring and the inner surface of the clamping cylinder.

To further achieve an object of the present disclosure, it is possible that the wedge-shaped sleeve is provided at one end with a flange, which is provided with four through holes at an interval of 90° in the ring direction, the sixth screw being connected to the inner cylinder through the through holes.

There may be three hooks, which are arranged in such a way that the wedge-shaped sleeve is provided on the outer periphery in the ring direction with three long grooves at an interval of 120°, each having at least two threaded holes; and each of the hooks is provided with at least two through holes, through which the third screw 10 penetrates to connect to the long grooves on the wedge-shaped sleeve.

A cross section of the step at the right end of the hook may be trapezoidal, the clamping cylinder may be provided on the inner wall with a grid-like square groove, and the clamping cylinder may be provided on both ends with eight straight grooves at an interval of 45° in the circumferential direction.

Each support block is provided at the left end face with two screw holes, each groove is provided at the bottom with two through holes, and the fifth screw is connected to the left end face of the support block through the through hole of the flange bush.

The flange at the left end of the flange bush is provided with four through holes at an interval of 90° in the ring direction, through which the seventh screw penetrates to connect the flange to the support plate; the left and right end faces of the support plate are provided with four threaded holes at an interval of 90° in the ring direction and three threaded holes at an interval of 120° in the circumferential direction, and can be connected to the outer sleeve via the eighth screw.

The jacket is connected to the outer sleeve through the fourth screw.

The inner cylinder is provided on the outer periphery in the ring direction with three guide key grooves at an interval of 120°, and the second screw fixes the guide key on the inner cylinder.

The left end of the threaded push rod is connected to the threaded hole at the right end of the second pull rod.

An internal and external clamping method of a thin-wall tubular part during rotary processing is characterized in that it comprises the following steps:

Step 1: before the rotary processing, the clampable region of the thin-wall tubular part is placed in the clamping cylinder;

step 2: the inner cylinder transmits the forward movement of the first pull rod and the second pull rod to the wedge-shaped sleeve; the wedge-shaped surface of the inner side at the right end of the wedge-shaped sleeve acts on the wedge-shaped surface of the outer wall at one end of the clamping cylinder, and the wedge-shaped surface of the inner side of the jacket acts on the wedge-shaped surface of the outer wall at the other end of the clamping cylinder, so that the two wedge-shaped surfaces work together to cause the clamping cylinder to contract to realize the external clamping of the tubular part during rotary processing;

step 3: at the same time of step 2, the threaded push rod converts the forward movement of the first pull rod and the second pull rod into the turning movement of the support claw ring, so that the support claw ring is expanded outward; besides, the threaded push rod finely adjusts the turning angle of the support claw ring to fully press against the inner wall of the part, so as to realize the internal clamping of the tubular part during rotary processing;

step 4: after the rotary processing is completed, the wedge-shaped sleeve transmits the backward movement of the first pull rod and the second pull rod to the hook, whose pull force makes the clamping cylinder return to its natural state to end the external clamping of the tubular part during rotary processing; and step 5: at the same time of step 4, the spring, the washer and the nut are combined to transmit the backward movement of the first pull rod and the second pull rod to the support claw ring, and the pressing force exerted by spring causes the support claw ring to retract, so as to end the internal clamping of the tubular part and remove the processed thin-wall tubular part from the internal and external clamping device.

Compared with the prior art, the present disclosure has the following beneficial effects:

The internal and external clamping method and device of a thin-wall tubular part during rotary processing provided by present disclosure can not only realize, during rotary processing, the internal and external clamping of a thin-wall tubular part with a short clampable region and a mouth portion smaller than the middle portion in diameter, and effectively solve the problem with the traditional thin-wall tubular part clamping method having a poor clamping effect and easy to cause slip during the processing, but also improve the clamping reliability of the thin-wall tubular part and reduce the production cost.

In the figures the following descriptions are for illustrative purposed: 1. First pull rod; 2. second pull rod; 3. first screw; 4. guide key; 5. second screw; 6. inner cylinder; 7. outer sleeve; 8. wedge-shaped sleeve; 9. hook; 10. third screw; 11. fourth screw; 12. clamping cylinder; 13. threaded push rod; 14. support claw ring; 15. spring; 16. washer; 17. nut; 18. support block; 19. rotary shaft; 20. jacket; 21. fifth screw; 22. flange bush; 23. sixth screw; 24. seventh screw; 25. support plate; and 26. eighth screw.

DETAILED DESCRIPTION OF THE EMBODIMENTS

In order to make the objects, technical solutions and advantages of the present disclosure clearer, the present disclosure will be further described in detail below in combination with specific examples and drawings; however, these embodiments do not limit the scope of protection of the present disclosure.

Figure 1:
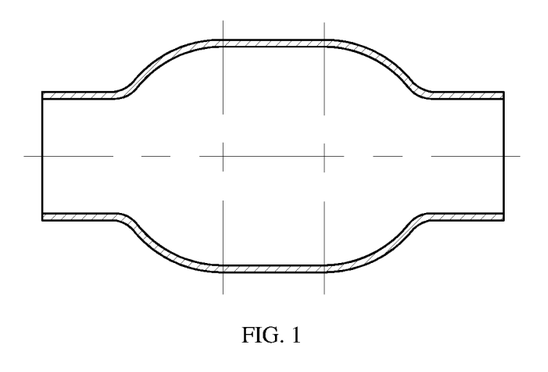
FIG. 1 is a schematic structural view of a thin-wall tubular part after rotary processing.

FIG. 1 is a schematic structural view of a thin-wall tubular part after rotary processing. As shown in FIG. 1, the thin-wall tubular part has a short clampable region, with the diameter of its mouth portion smaller than that of its middle portion.

Figure 2:
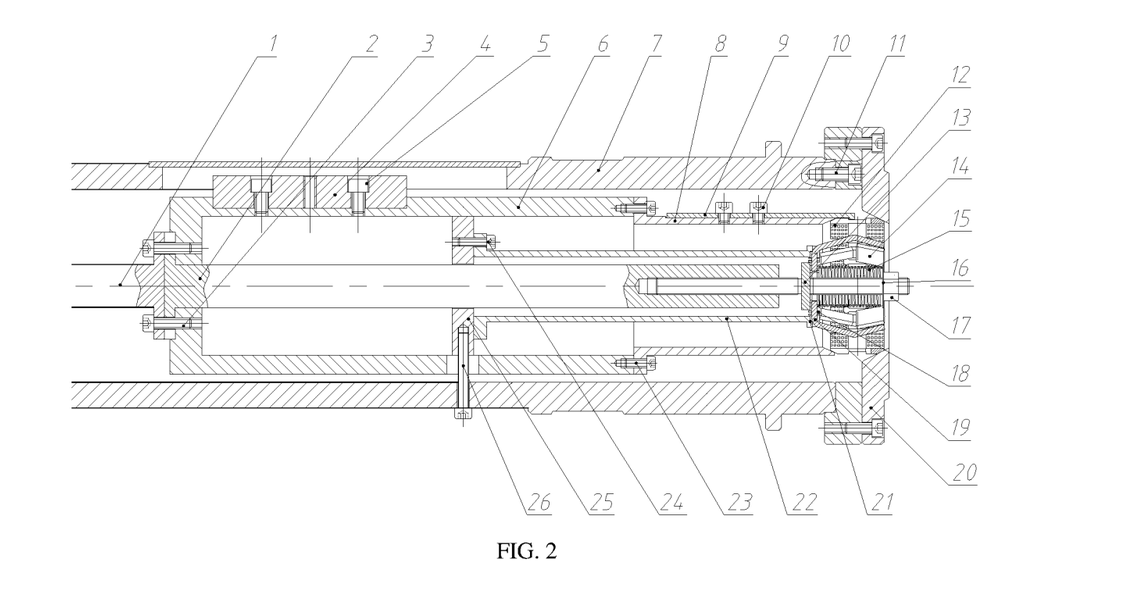
FIG. 2 is a schematic structural view of an internal and external clamping device of a thin-wall tubular part during rotary processing of the present disclosure.
Figure 3:
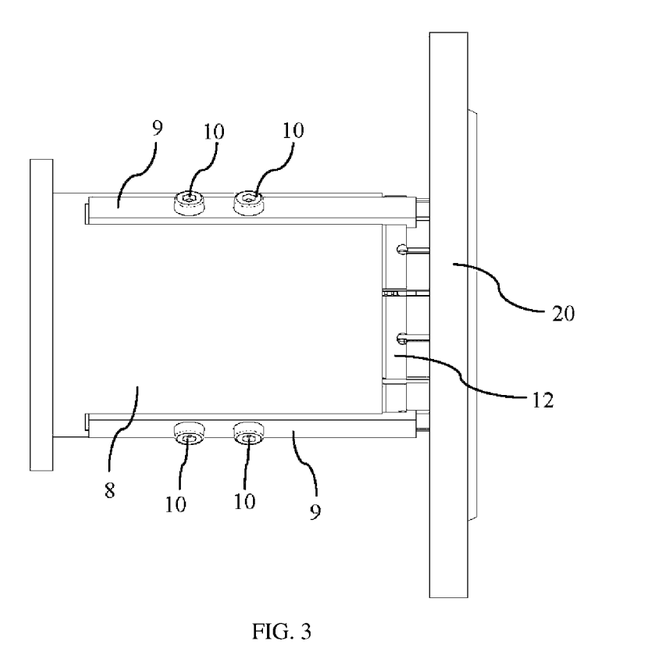
FIG. 3 is a front view of the outer clamping portion in FIG. 2.

As shown in FIG. 2, an internal and external clamping device of a thin-wall tubular part during rotary processing comprises a first pull rod 1, a second pull rod 2, an inner cylinder 6, an outer sleeve 7, a wedge-shaped sleeve 8, a hook 9, a clamping cylinder 12, a threaded push rod 13, a support claw ring 14, a spring 15, a washer 16, a nut 17, a support block 18, a rotary shaft 19, a jacket 20, a flange bush 22 and a support plate 25; the first pull rod 1 and the second pull rod 2 are respectively provided with a flange, through which the first screw 3 penetrates to connect the inner cylinder 6, thereby transmitting the driving force of the first pull rod 1 to the second pull rod 2 and the inner cylinder 6; with the first pull rod 1 arranged at one end of the second pull rod 2, the other end of the second pull rod 2 is connected to the threaded push rod 13, and preferably the left end of the thread rod 13 is connected to the threaded hole at the right end of the second pull rod 2; the inner cylinder 6 is provided on the outer periphery with the outer sleeve 7; the inner cylinder 6 is provided on the outer periphery in the ring direction with a plurality of guide key grooves, preferably three guide key grooves at an interval of 120°; the guide key groove is provided inside with the guide key 4, which is fixed by the second screw 5 on the inner cylinder 6; the outer sleeve 7 is provided with a guide groove on the inner cylindrical surface corresponding to the periphery of the guide key groove of the inner cylinder 6, and the guide key 4 can slide in the guide groove of the outer sleeve 7, such that the guide key 4 can transmit the rotary movement of the outer sleeve 7 to the inner cylinder 6, and transmit the rotary movement of the inner cylinder 6 to the first pull rod 1 and the second pull rod 2 through the first screw 3; with the outer sleeve 7 connected to the main shaft of the machine tool, the jacket 20 is connected to one end of the outer sleeve 7 through the fourth screw 11 and rotates with the outer sleeve 7, and is provided on the inner side with a wedge-shaped surface inclined at a certain angle to provide a pressing force to the outer wall of the clamping cylinder 12; the single piston rotary cylinder drives the first pull rod.

Figure 4:
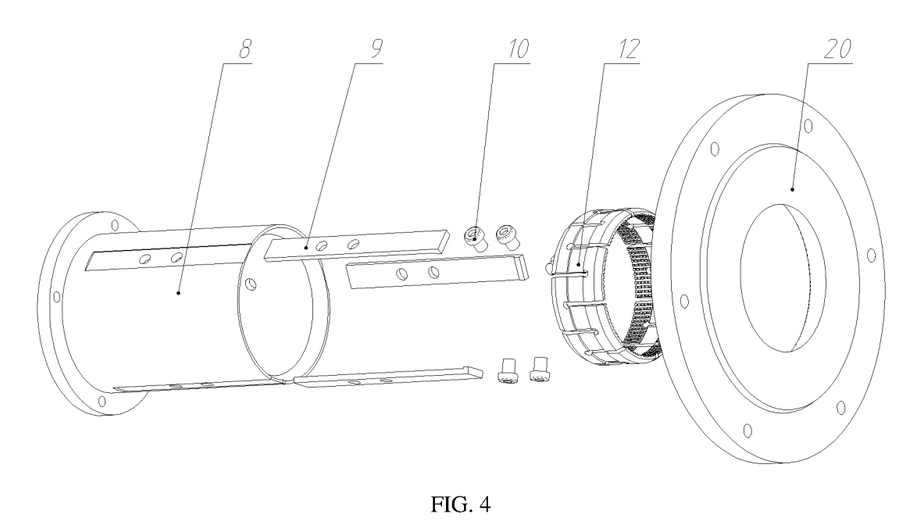
FIG. 4 is a split view of FIG. 3.
Figure 5:
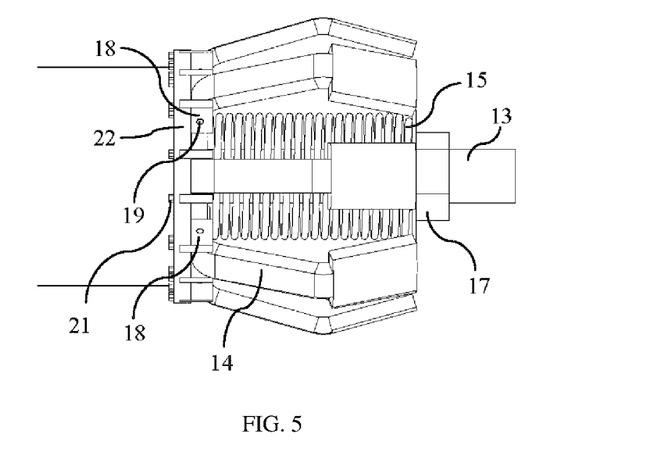
FIG. 5 is a front view of the inner clamping portion in FIG. 2.

As shown in FIG. 4, one end (the left end) of the wedge-shaped sleeve 8 is connected to the inner cylinder 5, and preferably provided with a flange, which is provided with four through holes at an interval of 90° in the ring direction, through which the sixth screw 23 penetrates to connect the inner cylinder 6; the inner side of the other end (the right end) of the wedge-shaped sleeve 8 is provided with a wedge-shaped surface having the same inclination angle as the inner side of the jacket 20; a plurality of hooks 9, preferably three, are arranged at intervals on the outer circumferential surface of the wedge-shaped sleeve 8; the hooks 9 are arranged in such a way that the wedge-shaped sleeve 8 is provided on the outer periphery in the ring direction with three long grooves at an interval of 120°, each having at least two threaded holes; and each of the hooks 9 is provided with at least two through holes, through which the third screw 10 penetrates to connect to the long grooves on the wedge-shaped sleeve 8; the hook 9 is provided at the right end with a step, whose cross section is preferably trapezoidal; the clamping cylinder 12 is provided on both sides of the outer wall with a wedge-shaped surface having the same inclination angle as the inner side of the right end of the wedge-shaped sleeve 8 and the inner side of the jacket 20; the clamping cylinder 12 is provided on the outer circumference with an annular groove, which is connected to the step on the hook 9 and used to provide a pull force to the clamping cylinder 12 during the backward movement of the first pull rod 1 to make the clamping cylinder 12 return to its natural state; the clamping cylinder 12 is provided on the inner wall with a grid-like groove, preferably a grid-like square groove, for improving the toughness of the clamping cylinder 12 and increasing friction; the clamping cylinder 12 is provided in the circumferential direction from both ends to the middle with a plurality of grooves at intervals, preferably eight straight grooves at an interval of 45° from each end, so as to provide a contraction space when the clamping cylinder 12 is subject to a pressing force.

Figure 6:
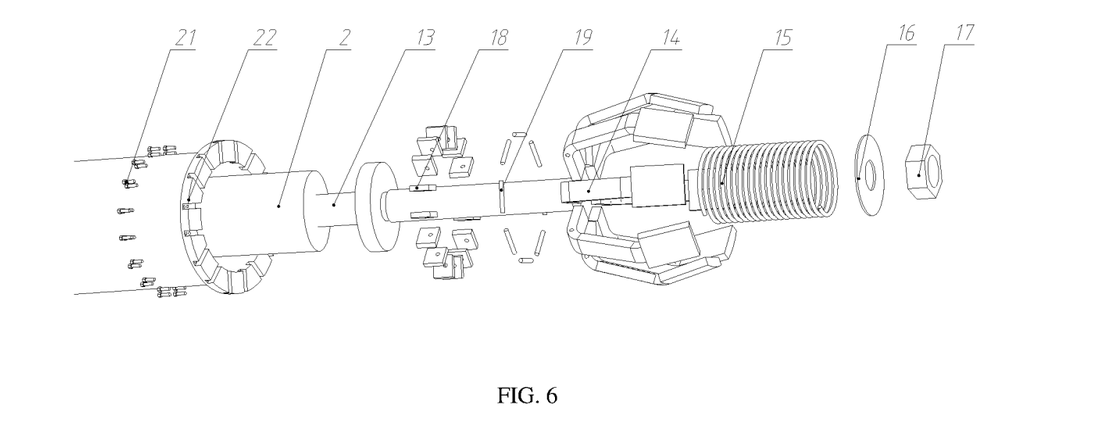
FIG. 6 is a split view of FIG. 5.

As shown in FIG. 6, the rotary shaft 19 is similar in shape to a pin, and is named the rotary shaft from the perspective of its function.

As shown in FIG. 6, a plurality of support blocks 18 are spaced to form an annular structure around the flange bush 22; the middle portion of each support block 18 is provided with a through hole; a support claw is provided between every two support blocks 18, and the side surface of the support claw is provided with the through hole; a rotary shaft 19 penetrates through the through holes in the support claws and the support blocks 18, so as to connect one support claw and two support blocks 18 together.

Figure 8:
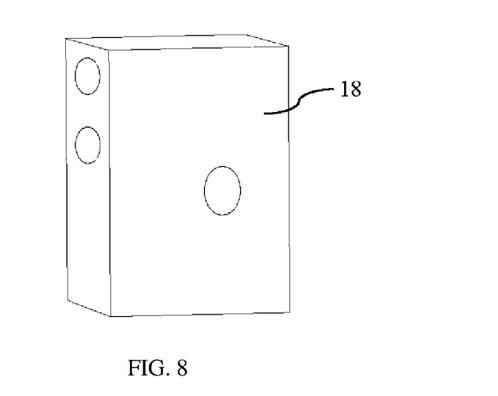
FIG. 8 is a schematic structural view of the support block in FIG. 2.

As shown in FIG. 8, each support block 18 is provided at the left end face with two screw holes for connecting with the flange bush 22; a plurality of support blocks 18 are spaced to form an annular structure around the flange bush 22.

Figure 9:
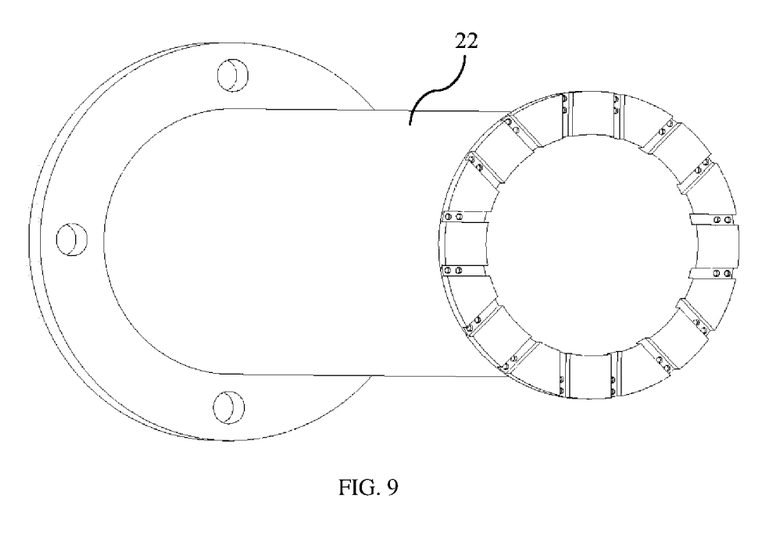
FIG. 9 is a schematic structural view of the flange bush in FIG. 2.

As shown in FIG. 9, the flange bush 22 is provided at the right end with a flange, which is provided at the right end face with grooves identical to the support blocks 18 in number and shape; each of the grooves is provided at the bottom with two adjacent through holes, through which the fifth screw 21 is connected to the left end face of the support block 18 for fixing the support block 18 in the groove of the flange at the right end of the flange bush 22.

As shown in FIG. 6, the threaded push rod 13, provided with a round step, is connected at the left end to the threaded hole at the right end of the second pull rod 2, and has the spring 15, the washer 16 and the nut 17 sleeved thereon.

Figure 7:
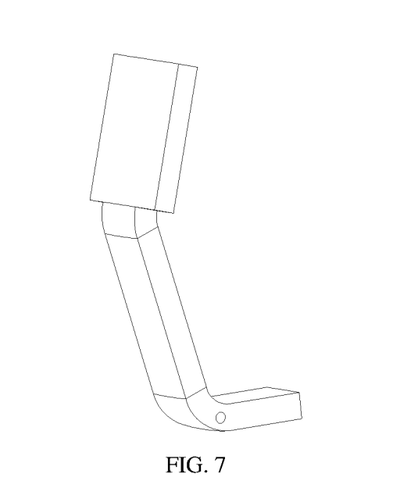
FIG. 7 is a schematic structural view of the support claw in FIG. 2.

A plurality of support claws, preferably 8, are spaced to form a support claw ring 14 having the annular structure. As shown in FIG. 7, each support claw is formed by connecting the front end, the rear end, and the bottom; the outer surface of the front end, used to press against the inner wall of the thin-wall tubular part, is an arc surface with the same curvature as the inner wall of the thin-wall tubular part; the support claw is provided at the side of the bottom with a through hole, through which the rotary shaft 19 penetrates to connect the support claw to the support blocks 18 at the left and right ends. When the first pull rod 1 moves forward, it drives the second pull rod 2 and the threaded push rod 13 connected to the second pull rod 2 to move forward; this causes the round step arranged on the threaded push rod 13 to move forward, which pushes the support claw ring 14 to turn outward around the rotary shaft 19, with the bottom of the support claw ring 14 inclined at a certain angle.

The left end of the spring 15 is in contact with the bottom of the support claw ring 14; the support claw ring 14 is turned outward and expanded during the processing to press against the inner wall of the thin-wall tubular part, with the bottom of the support claw ring 14 inclined at a certain angle; when it is necessary to end the pressing against the inner wall of the thin-wall tubular part after the processing is completed, the pressing force of the spring 15 will act on the bottom of the support claw ring 14 in the inclined state, so that the support claw ring 14 is retracted until its bottom returns to the initial state without the inclined angle. The spring 15 is provided at the right end with a washer 16 and a nut 17, and is compressed by the washer 16 through the nut 17. When the first pull rod 1 moves backward, it drives the second pull rod 2 and the threaded push rod 13 connected to the second pull rod 2 to move backward, so that the nut 17 sleeved on the threaded push rod 13 moves backward accordingly; the nut 17 presses the washer 16, thereby compressing the spring 15; the contraction of the spring 15 will provide a pressing force to the bottom of the support claw ring 14 that has been inclined at a certain angle due to the turning outward of the support claw ring 14 moving forward, and cause the support claw ring 14 to turn inward around the rotary shaft 19 until the bottom of the support claw ring 14 returns to the initial state without an inclination angle. The clamping of the thin-wall tubular part needs to be completed before the start of rotary processing when the nut 17 is not rotating; the nut 17 rotates during the processing, but remains stationary relative to the threaded push rod 13, so the position of the nut 17 on the threaded push rod is fixed; the backward movement of the threaded push rod 13 will directly drive the nut 17 to move backward, so that the washer 16 can be pressed.

One end of the outer circumference of the clamping cylinder 12 is arranged in the wedge-shaped surface of the wedge-shaped sleeve 8, and the other end arranged in the wedge-shaped surface of the jacket 20; the jacket 20, arranged at the end of the outer sleeve 7, is connected to the outer sleeve 7 through the fourth screw 11; the support claw ring 14 is placed inside the clamping cylinder 12, and the thin-wall tubular part is placed between the outer surface of the support claw ring 14 and the inner surface of the clamping cylinder 12, with the support claw ring 14 and the clamping cylinder 12 respectively used for internal and external clamping of the thin-wall tubular part; the clamping cylinder 12 produces a certain degree of contraction deformation under the action of the pressing force provided by the wedge-shaped sleeve 8 at the left end and the jacket 20 at the right end, thus achieving the external clamping of the thin-wall tubular part; the support claw ring 14 is turned outward around the rotary shaft 19 under the pushing of the round step on the threaded push rod 13, so as to press against the inner wall of the thin-wall tubular part at the corresponding position, thereby achieving the inner clamping of the thin-wall tubular part.

As shown in FIGS. 2, 6 and 9, the flange at the left end of the flange bush 22 is provided with four through holes at an interval of 90° in the ring direction, through which the seventh screw 24 penetrates to connect the flange to the support plate 25; the left and right end faces of the support plate 25 are provided with four threaded holes at an interval of 90° in the ring direction and three threaded holes at an interval of 120° in the circumferential direction, and can be connected to the outer sleeve 7 via the eighth screw 26.

When the first pull rod 1 and the second pull rod 2 move forward, the threaded push rod 13 will move forward accordingly; the round step arranged on the threaded push rod 13 can cause the support claw ring 14 to turn outward around the rotary shaft 19, thus making the support claw ring 14 expanded.

When the thin-wall tubular part is to be clamped externally, the left and right ends of the clamping cylinder 11 are respectively subjected to the pressing force provided by the wedge-shaped sleeve 8 and the jacket 20, so that the clamping cylinder 12 produces a certain degree of contraction deformation to achieve the external clamping; when the external clamping is to be ended, the backward movement of the first pull rod 1 and the second pull rod 2 are transmitted to the hook 9, whose pull force reduces the area of the clamping cylinder 12 in contact with the wedge-shaped sleeve 8 and the jacket 20 and thus reduces the pressing force provided by the two, with the clamping cylinder 12 returning to its natural state when the pressing force is zero.

When the first pull rod 1 moves backward, it drives the second pull rod 2 and the threaded push rod 13 connected to the second pull rod 2 to move backward, so that the nut 17 sleeved on the threaded rod push 13 makes backward movement, which is transmitted to the spring 15 through the washer 16 to make the spring 15 contract; with the spring 15 in contact with the bottom of the support claw ring 14, the contraction of the spring 15 will exert a pressing force on the bottom of the support claw ring 14, so that the support claw ring 14 turns inward around the rotary shaft 19, thereby achieving the retraction of the support claw ring 14.

The first screw 3, the second screw 5, the third screw 10, the fourth screw 11, the fifth screw 21, the sixth screw 23, the seventh screw 24, and the eighth screw 26 of the present disclosure are all preferably hexagon socket screws.

An internal and external clamping method of a thin-wall tubular part during rotary processing comprises the following steps:

Step 1: before the rotary processing, the clampable region of the thin-wall tubular part shown in FIG. 1 is placed in the clamping cylinder 12;

step 2: the inner cylinder 6 transmits the forward movement of the first pull rod 1 and the second pull rod 2 to the wedge-shaped sleeve 8, which together with the jacket 20 causes the clamping cylinder 12 to contract; in addition to the wedge-shaped surface of the inner side at the right end of the wedge-shaped sleeve 8 acting on the wedge-shaped surface of the outer wall at one end of the clamping cylinder 12, the wedge-shaped surface of the inner side of the jacket 20 also acts on the wedge-shaped surface of the outer wall at the other end of the clamping cylinder 12, so as to achieve the external clamping of the tubular part during the rotary processing;

step 3: at the same time of step 2, the threaded push rod 13 converts the forward movement of the first pull rod 1 and the second pull rod 2 into the turning movement of the support claw ring 14, so that the support claw ring 14 is expanded outward; besides, the threaded push rod 12 finely adjusts the turning angle of the support claw ring 14 to fully press against the inner wall of the part, so as to realize the internal clamping of the tubular part during rotary processing;

step 4: after the rotary processing is completed, the wedge-shaped sleeve 8 transmits the backward movement of the first pull rod 1 and the second pull rod 2 to the hook 9, whose pull force makes the clamping cylinder 11 return to its natural state to end the external clamping of the tubular part during rotary processing; and step 5: at the same time of step 4, the spring 15, the washer 16 and the nut 17 are combined to transmit the backward movement of the first pull rod 1 and the second pull rod 2 to the support claw ring 14, and the pressing force exerted by spring 15 causes the support claw ring 14 to retract, so as to end the internal clamping of the tubular part and remove the processed thin-wall tubular part from the internal and external clamping device.

The above embodiments do not limit the present disclosure; any equivalent structure or equivalent process transformation based on the description and the drawings of the present disclosure, whether directly or indirectly used in other related technical fields, are likewise included in the scope of protection of the present disclosure.

The invention claimed is:

1. An internal and external clamping device comprising a first pull rod, a second pull rod, an inner cylinder, an outer sleeve, a wedge-shaped sleeve, a hook, a clamping cylinder, a threaded push rod, a support claw ring, a spring, a washer, a nut, a support block, a rotary shaft, a jacket, a flange bush and a support plate; the first pull rod and the second pull rod are connected with each other and respectively provided with a flange; the second pull rod is connected with the inner cylinder, and connected at another end with the threaded push rod, the first pull rod being disposed at one end of the second pull rod, the inner cylinder being provided on an outer side with the outer sleeve; the inner cylinder is provided on an outer periphery in a ring direction with a plurality of guide key grooves, which are provided inside with guide keys; the outer sleeve is provided with a guide groove on an inner cylindrical surface corresponding to a periphery of the guide key groove of the inner cylinder, and connected at one end to a main shaft of a machine tool and at another end to the jacket;

the wedge-shaped sleeve is connected at one end to the inner cylinder, and at another end to the clamping cylinder, the another end of which is arranged in a wedge-shaped surface of the jacket;

the wedge-shaped sleeve is provided on an outer peripheral surface with a plurality of hooks at intervals, which are provided with steps at the right end; the clamping cylinder is provided on both sides of an outer wall with a wedge-shaped surface having a same inclination angle as an inner side of one end of the wedge-shaped sleeve and an inner side of the jacket; the clamping cylinder is provided on an outer circumference with an annular groove, which is connected to the step on the hook; the clamping cylinder is provided with a plurality of grooves at intervals in a circumferential direction from both ends to a middle;

a plurality of support blocks are spaced to form an annular structure around the flange bush; a middle portion of each support block is provided with a through hole; a support claw is provided between every two support blocks, and a side surface of the support claw is provided with the through hole; a rotary shaft penetrates through the through holes in the support claws and the support blocks; a plurality of rotary shafts are spaced to form an annular structure around the flange bush;

the flange bush, arranged between the inner cylinder and the second pull rod, is provided at one end with a flange, which is provided at one end face with grooves identical to the support blocks in number and shape, with the support block fixed in the groove of the flange of the flange bush; the other end of the flange bush is connected through the flange to the support plate, which is connected to the outer sleeve;

a round step is arranged on the threaded push rod, on which the spring, the washer and the nut are sleeved; a plurality of support claws are spaced to form the support claw ring having the annular structure; each support claw is formed by connecting a front end, a rear end, and a bottom; the outer surface of the front end, used to press against an inner wall of a thin-wall tubular part, is an arc surface with the same curvature as the inner wall of the thin-wall tubular part; the spring is connected at one end to the bottom of the support claw ring, and at the other end to the washer, with a nut arranged outside the washer; the support claw ring is placed inside the clamping cylinder, and the thin-wall tubular part is placed between an outer surface of the support claw ring and an inner surface of the clamping cylinder.

2. The internal and external clamping device as claimed in claim 1, wherein the wedge-shaped sleeve is provided at one end with a flange, which is provided with four through holes at an interval of 90° in the ring direction, a sixth screw being connected to the inner cylinder through the four through holes.

3. The internal and external clamping device as claimed in claim 1, further comprising three hooks which are arranged in such a way that the wedge-shaped sleeve is provided on the outer periphery in the ring direction with three long grooves at an interval of 120°, each having at least two threaded holes; and each of the hooks is provided with at least two through holes, through which a third screw penetrates to connect to the long grooves on the wedge-shaped sleeve.

4. The internal and external clamping device as claimed in claim 1, wherein a cross section of the step at the right end of the hook is trapezoidal; the clamping cylinder is provided on the inner wall with a square groove; the clamping cylinder is provided on both ends with eight straight grooves at an interval of 45° in the circumferential direction.

5. The internal and external clamping device as claimed in claim 1, wherein each support block is provided at a left end face with two screw holes, each groove is provided at a bottom with two through holes, and a fifth screw is connected to the left end face of the support block through a through hole of the flange bush.

6. The internal and external clamping device as claimed in claim 1, wherein a flange that is located at a left end of the flange bush is provided with four through holes at an interval of 90° in the ring direction, through which a seventh screw penetrates to connect the flange to the support plate; a left and right end faces of the support plate are provided with four threaded holes at an interval of 90° in the ring direction and three threaded holes at an interval of 120° in the circumferential direction, and can be connected to the outer sleeve via an eighth screw.

7. The internal and external clamping device as claimed in claim 1, wherein the jacket is connected to the outer sleeve through a fourth screw.

8. The internal and external clamping device as claimed in claim 1, wherein the inner cylinder is provided on the outer periphery in the ring direction with three guide key grooves at an interval of 120°; and a second screw fixes the guide key on the inner cylinder.

9. The internal and external clamping device as claimed in claim 1, wherein the left end of the threaded push rod is connected to a threaded hole at a right end of the second pull rod.

10. An internal and external clamping method comprising the following steps:

step 1: before rotary processing, a clampable region of a thin-wall tubular part is placed in a clamping cylinder;

step 2: an inner cylinder transmits forward movement of a first pull rod and a second pull rod to a wedge-shaped sleeve; a wedge-shaped surface of an inner side at a right end of the wedge-shaped sleeve acts on a wedge-shaped surface of an outer wall at one end of the clamping cylinder, and a wedge-shaped surface of an inner side of a jacket acts on the wedge-shaped surface of the outer wall at another end of the clamping cylinder, so that the wedge-shaped surface of the wedge-shaped sleeve and the wedge-shaped surface of the jacket work together to cause the clamping cylinder to contract to realize an external clamping of a tubular part during rotary processing;

step 3: a threaded push rod converts a forward movement of the first pull rod and the second pull rod into a turning movement of a support claw ring, so that the support claw ring is expanded outward; the threaded push rod is operable to finely adjust a turning angle of the support claw ring to fully press against an inner wall of the tubular part, so as to realize an internal clamping of the tubular part during rotary processing;

step 4: after the rotary processing is completed, the wedge-shaped sleeve transmits a backward movement of the first pull rod and the second pull rod to a hook, whose pull force makes the clamping cylinder return to a natural state to end the external clamping of the tubular part during rotary processing; and step 5: a spring, washer and nut are combined to transmit the backward movement of the first pull rod and the second pull rod to the support claw ring, and a pressing force exerted by the spring causes the support claw ring to retract, so as to end the internal clamping of the tubular part and remove a processed thin-wall tubular part from an internal and external clamping device.

11. An internal and external clamping device comprising:

a first pull rod, a second pull rod, an inner cylinder, an outer sleeve, a wedge-shaped sleeve, a hook, a clamping cylinder, a threaded push rod, a support claw ring, a support block, a rotary shaft, a jacket, a flange bush and a support plate;

wherein the first pull rod and the second pull rod are connected with each other and respectively provided with a flange;

wherein the second pull rod is connected to the inner cylinder, and connected at another end with the threaded push rod, the first pull rod being disposed at one end of the second pull rod, the inner cylinder being provided on an outer side with the outer sleeve;

wherein the inner cylinder is provided with a plurality of guide key grooves; and wherein the outer sleeve is provided with a guide groove on an inner cylindrical surface corresponding to a periphery of the guide key grooves of the inner cylinder and is connected at one end to a main shaft of a machine tool and at the other end to the jacket.

* * * * *